US012652287B2

(12) United States Patent
Kannery et al.

(10) Patent No.: US 12,652,287 B2
(45) Date of Patent: Jun. 9, 2026

(54) TELEMETRY DATA PROCESSING IN CLUSTER FILE SYSTEM USING ROLE-BASED ACCESS CONTROL (RBAC) BASED DYNAMIC CATALOG

(71) Applicant: Dell Products L.P., Round Rock, TX (US)

(72) Inventors: Supriya Kannery, Bengaluru (IN); Rajat Badola, Bengaluru (IN); Philip Shilane, Newtown, PA (US)

(73) Assignee: Dell Products L.P., Round Rock, TX (US)

( * ) Notice: Subject to any disclaimer, the term of this patent is extended or adjusted under 35 U.S.C. 154(b) by 1 day.

(21) Appl. No.: 18/785,726

(22) Filed: Jul. 26, 2024

(65) Prior Publication Data

US 2026/0032125 A1      Jan. 29, 2026

(51) Int. Cl.
*H04L 9/40*          (2022.01)

(52) U.S. Cl.
CPC ............ *H04L 63/104* (2013.01); *H04L 63/20* (2013.01)

(58) Field of Classification Search
CPC ... H04L 63/0263; H04L 63/20; H04L 63/101; H04L 63/104
See application file for complete search history.

(56) References Cited

U.S. PATENT DOCUMENTS

| | | | | |
|---|---|---|---|---|
| 11,140,455 B1 * | 10/2021 | Woodruff | ........... | H04N 21/2187 |
| 12,007,865 B2 * | 6/2024 | Kommula | ............... | H04L 41/16 |
| 12,021,888 B1 * | 6/2024 | Reed | ................... | H04L 63/1425 |
| 12,413,491 B2 * | 9/2025 | Vegas | ..................... | H04L 41/14 |
| 12,452,279 B1 * | 10/2025 | Reed | ........................ | H04L 63/20 |
| 2003/0078932 A1 * | 4/2003 | Kaiserwerth | ........... | G06F 16/25 |
| 2018/0234377 A1 * | 8/2018 | Gray | .................... | G06Q 10/107 |
| 2019/0028552 A1 * | 1/2019 | Johnson, II | ........... | H04L 67/146 |
| 2021/0168150 A1 * | 6/2021 | Ross | .................. | G06F 16/9024 |
| 2021/0306899 A1 * | 9/2021 | Mishra | .............. | H04W 28/0975 |
| 2022/0141201 A1 * | 5/2022 | Lal | ...................... | H04L 63/1475 |
| 2023/0104368 A1 * | 4/2023 | Miriyala | ................. | G06F 9/547 726/1 |
| 2023/0217273 A1 * | 7/2023 | Viswambharan | ..... | H04W 12/61 370/242 |

(Continued)

OTHER PUBLICATIONS

Adebayo, Ayobami, et al. "A conceptual model for secure DevOps architecture using Jenkins, Terraform, and Kubernetes." International Journal of Multidisciplinary Research and Growth Evaluation 4.1 (2023): 1300-1317. (Year: 2023).*

(Continued)

*Primary Examiner* — Kari L Schmidt
(74) *Attorney, Agent, or Firm* — Staniford Tomita LLP

(57)          ABSTRACT

A telemetry processing system in a cluster network generates telemetry data from a plurality of telemetry producers and formats it into a structured format for storage in a datastore. Users of the telemetry data are mapped to specific role-based access control (RBAC) rules per an identity and management (LAM) module. This mapping is stored in a dynamic RBAC-based telemetry catalog for further rules checking as telemetry data is generated. This adds a second layer above user subscription terms to safeguard the security of telemetry data based on RBAC rules, and allows the system to define conditions under which certain users can receive certain types of telemetry data in an efficient and dynamic manner.

16 Claims, 9 Drawing Sheets

(56) References Cited

U.S. PATENT DOCUMENTS

| | | | | |
|---|---|---|---|---|
| 2023/0222043 | A1* | 7/2023 | Lee | G06F 11/3068 |
| | | | | 702/127 |
| 2023/0300218 | A1* | 9/2023 | Karthikeyan | H04W 4/38 |
| | | | | 709/224 |
| 2023/0336414 | A1* | 10/2023 | Miriyala | G06F 9/541 |
| 2023/0336447 | A1* | 10/2023 | Kommula | H04L 41/0681 |
| 2023/0362236 | A1* | 11/2023 | Nair | H04L 67/1001 |
| 2023/0409369 | A1* | 12/2023 | Liu | H04L 41/0895 |
| 2024/0126632 | A1* | 4/2024 | Habel | G06F 11/0772 |
| 2024/0214294 | A1* | 6/2024 | Miriyala | H04L 43/08 |
| 2024/0223454 | A1* | 7/2024 | Miriyala | H04L 63/20 |
| 2024/0291831 | A1* | 8/2024 | Tembey | G06F 9/547 |
| 2024/0406277 | A1* | 12/2024 | Henkel | H04L 45/745 |
| 2024/0421979 | A1* | 12/2024 | Kenchaiah | H04L 9/08 |
| 2025/0335282 | A1* | 10/2025 | Tiwary | G06F 11/323 |
| 2025/0335285 | A1* | 10/2025 | Santangelo | G06F 11/0793 |

OTHER PUBLICATIONS

Thaler, Justin, et al. "Hybrid approach to hpc cluster telemetry and hardware log analytics." 2020 IEEE High Performance Extreme Computing Conference (HPEC). IEEE, 2020. (Year: 2020).*

* cited by examiner

150

300

500

| CONSUMER | SAMPLE DATASET CONSUMED | PURPOSE |
|---|---|---|
| Storage Users | Alerts, Summary, Security State | Generate daily alert summary to cover any missed asynch alert |
| GUI | Performance, Topology | GUI displays topology and performance details in real time |
| Internal Pods | Feature details | Internal services consume system performance info to adjust resources |
| Storage Vendor | License, capacity information | Storage vendor enforces business terms |

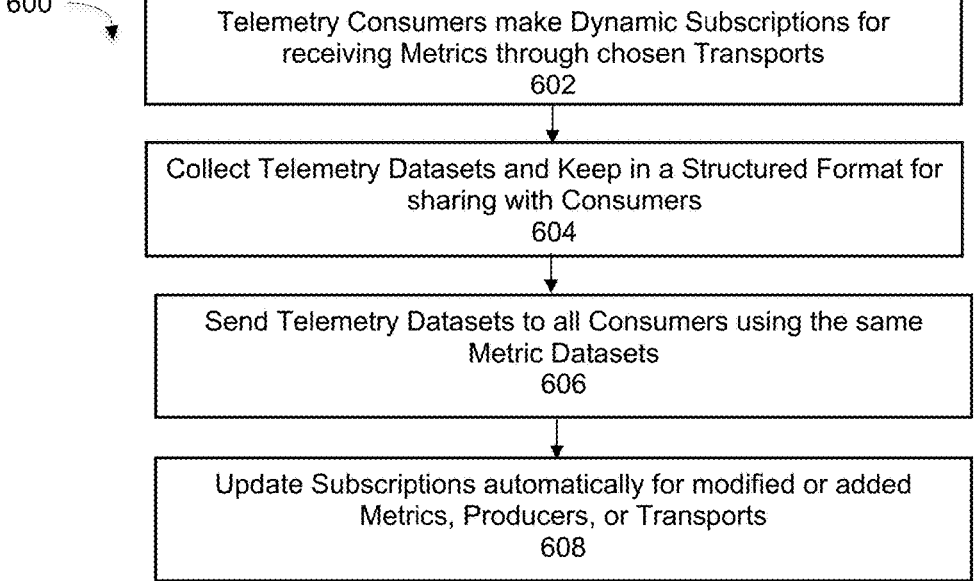

Telemetry Consumers make Dynamic Subscriptions for receiving Metrics through chosen Transports
602

Collect Telemetry Datasets and Keep in a Structured Format for sharing with Consumers
604

Send Telemetry Datasets to all Consumers using the same Metric Datasets
606

Update Subscriptions automatically for modified or added Metrics, Producers, or Transports
608

| USER | Notification Filters | Transport | Transport ID |
|---|---|---|---|
| User-1 | Metric | Webhook | Webhook_target_ID |
| User-2 | Alerts | SMTP | SMTP_target_ID |

| Webhook_target_ID | URL | Server Name | Enabled | Retry Limit |
|---|---|---|---|---|
| Webhook-01 | https://internal.com/webhook-targets/callback1 | callback1 | True | 3 |
| Webhook-02 | https://internal.com/webhook-targets/callback2 | callback2 | True | 3 |

| Index | Time | disk | firmware | flags | gauge |
|---|---|---|---|---|---|
| 1 | 171036...00000 | dev4 | N/A | 0.000 | 1.0000 |

802b

| Model | otel.library.name | version | Part No. | Serial No. | Slot | Start Time |
|---|---|---|---|---|---|---|
| VMware Vdisk | metricstest/example | 0.1.0 | N/A | 6000c293 | 160.4 | 1710....0000 |

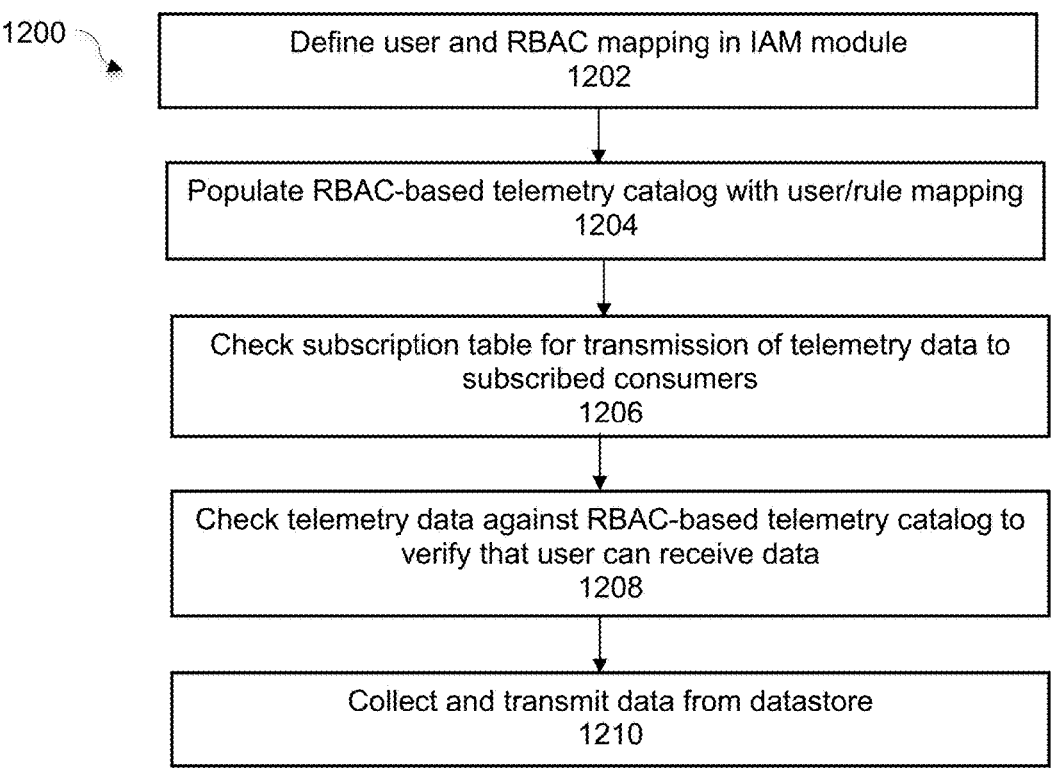

Define user and RBAC mapping in IAM module
1202

Populate RBAC-based telemetry catalog with user/rule mapping
1204

Check subscription table for transmission of telemetry data to subscribed consumers
1206

Check telemetry data against RBAC-based telemetry catalog to verify that user can receive data
1208

Collect and transmit data from datastore
1210

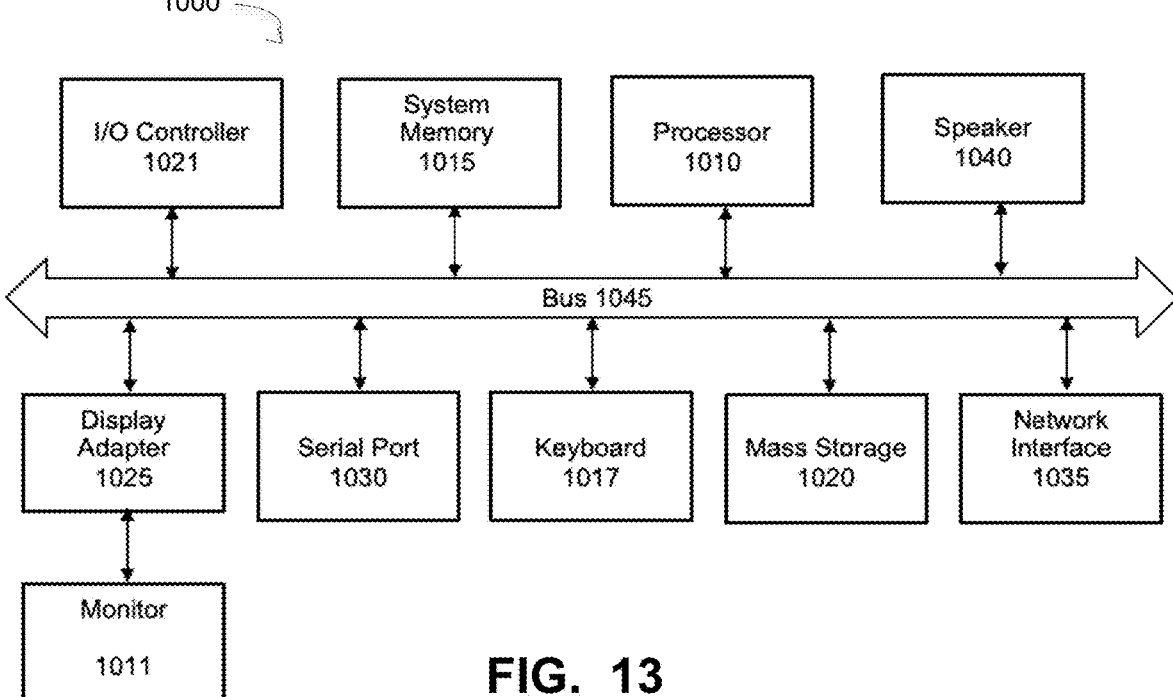

I/O Controller 1021

System Memory 1015

Processor 1010

Speaker 1040

Bus 1045

Display Adapter 1025

Serial Port 1030

Keyboard 1017

Mass Storage 1020

Network Interface 1035

Monitor 1011

FIG. 13

TELEMETRY DATA PROCESSING IN CLUSTER FILE SYSTEM USING ROLE-BASED ACCESS CONTROL (RBAC) BASED DYNAMIC CATALOG

TECHNICAL FIELD

Embodiments are directed to distributed networks, and more specifically to providing telemetry data management through an RBAC-based dynamic catalog.

BACKGROUND

A distributed (or cluster) network runs a filesystem in which data is spread across multiple storage devices as may be provided in a cluster of nodes. Cluster networks (or cluster systems) represent a scale-out solution to single node systems by providing networked computers that work together so that they essentially form a single system. Each computer forms a node in the system and runs its own instance of an operating system. The cluster itself has each node set to perform the same task that is controlled and scheduled by software. In this type of network, the file system is shared by being simultaneously mounted on multiple servers. This type of distributed filesystem can present a global namespace to clients (nodes) in a cluster accessing the data so that files appear to be in the same central location. They are typically very large and may contain many hundreds of thousands or even many millions of files, as well as services (applications) that use and produce data.

The Santorini filesystem represents a type of cluster system that stores the file system metadata on a distributed key value store and the file data on object store. The file/namespace metadata can be accessed by any front end node, and any file can be opened for read/write operations by any front-end node.

Because of their extensive scale and complex component features, cluster systems are typically provided by vendors and installed for use by customers (users). Proper system administration requires the collection and transmission of relevant data to users from applications, nodes, and product vendors within the system. Such data is referred to as "telemetry" data and includes information about the running system that is generated periodically and that should be stored and transferred to the various clients as needed.

Present telemetry architectures are typically fixed with respect to the type and amount of data that is available for users and clients. As distributed systems evolve and become more complex, it is increasingly important to provide flexible telemetry mechanisms for storage systems. Present systems are not flexible and dynamic enough to add new metric data sets, or data producers or consumers to the system.

Many types of data can be deemed to be restrictive, confidential, sensitive, protected and so on. One shortcoming of present systems is that telemetry data is usually transmitted to all users. In many cases, however, and especially those involving data security, it is desirable to limit dissemination of telemetry data to only certain users.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. Dell and EMC are trademarks of Dell Technologies, Inc.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 5 is a table that lists some example consumers and datasets for the system of FIG. 4, under some embodiments.

FIG. 6 is a flowchart that illustrates a process of implementing a subscription-based telemetry architecture for Kubernetes-based scale-out products, under some embodiments.

FIG. 7A illustrates an example user subscription table, under some embodiments.

FIG. 7B illustrates an particular example transport target table for FIG. 7A.

FIG. 8 illustrates a table storing a dataset for a pod, under an example embodiment.

FIG. 12 is a flowchart that illustrates a method of allowing access to telemetry data through an RBAC-based dynamic catalog, under some embodiments.

FIG. 13 is a block diagram of a computer system used to execute one or more software components of the processes described herein, under some embodiments.

DETAILED DESCRIPTION

Figure 1:
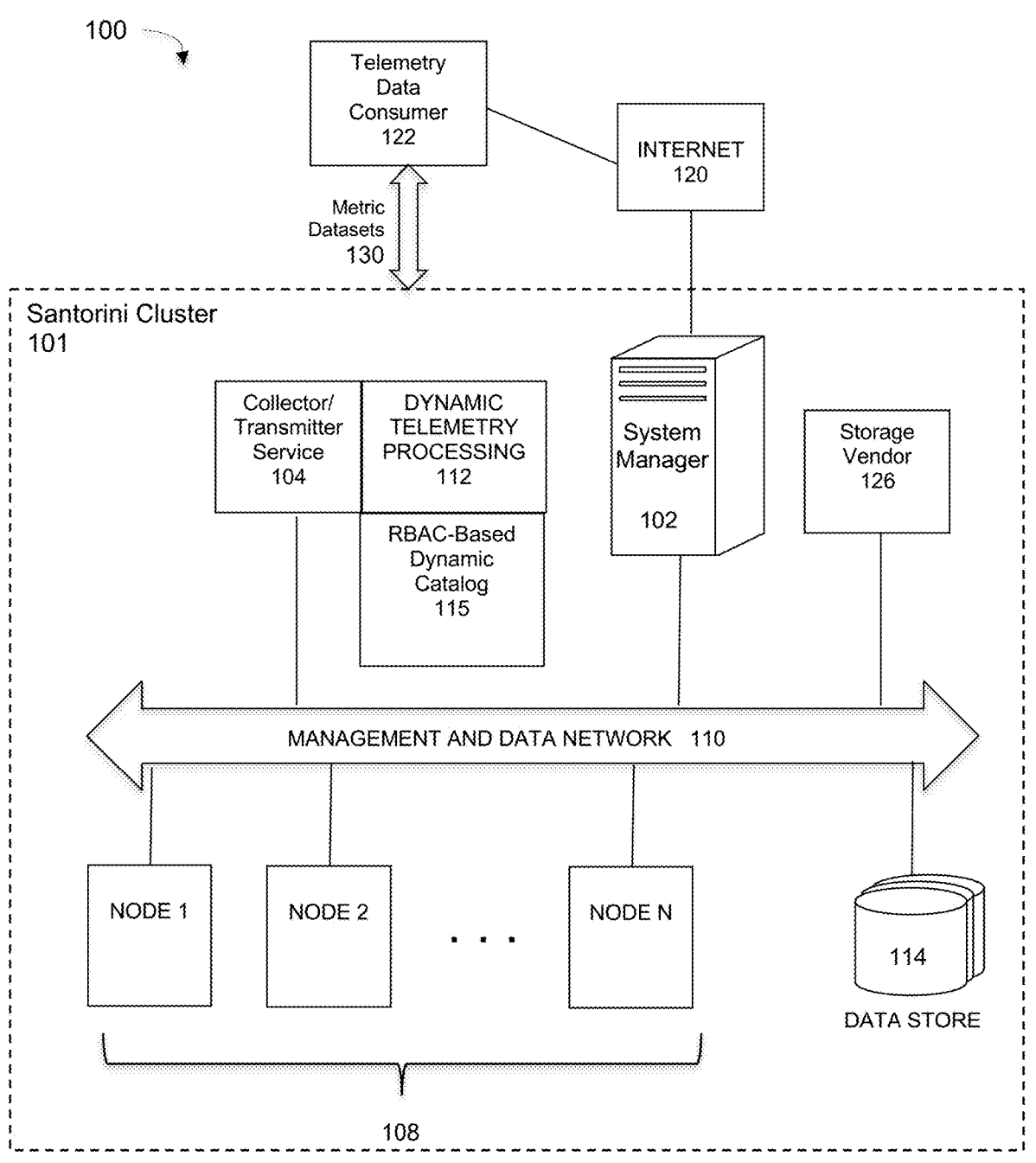
FIG. 1 is a block diagram illustrating a distributed system implementing flexible telemetry processing for cluster networks, under some embodiments.

A detailed description of one or more embodiments is provided below along with accompanying figures that illustrate the principles of the described embodiments. While aspects of the invention are described in conjunction with such embodiments, it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information.

Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. In this specification, these implementations, or any other form that the invention may take, may be referred to as techniques. In general, the order of the steps of disclosed processes may be altered within the scope of the described embodiments.

Embodiments are directed to a processing components for features implementing telemetry data process for cluster network filesystems (e.g., Santorini) for providing users with a flexible system environment where they can dynamically subscribe for different telemetry metrics through preferred transports.

FIG. 1 is a block diagram illustrating a distributed system implementing flexible telemetry processing for cluster networks, under some embodiments. System 100 comprises a large-scale network that includes a cluster network 101 having a number of different devices, such as server or client computers 102, nodes 108, storage devices 114, and other similar devices or computing resources. Other networks may be included in system 100 including local area network (LAN) or cloud networks, and virtual machine (VM) storage or VM clusters. These devices and network resources may be connected to a central network, such as a data and management network 110 that itself may contain a number of different computing resources (e.g., computers, interface devices, and so on). FIG. 1 is intended to be an example of a representative system implementing a distributed computing system under some embodiments, and many other topographies and combinations of network elements are also possible.

A distributed system 101 (also referred to as a cluster or clustered system) typically consists of various components (and processes) that run in different computer systems (also called nodes) that are connected to each other. These components communicate with each other over the network via messages and based on the message content, they perform certain acts like reading data from the disk into memory, writing data stored in memory to the disk, perform some computation (CPU), sending another network message to the same or a different set of components and so on. These acts, also called component actions, when executed in time order (by the associated component) in a distributed system would constitute a distributed operation.

A distributed system may comprise any practical number of compute nodes 108. For system 100, n nodes 108 denoted Node 1 to Node N are coupled to each other and a connection manager 102 through network 110. The connection manager can control automatic failover for high-availability clusters, monitor client connections and direct requests to appropriate servers, act as a proxy, prioritize connections, and other similar tasks.

In an embodiment, cluster network 101 may be implemented as a Santorini cluster that supports applications such as a data backup management application that coordinates or manages the backup of data from one or more data sources, such as other servers/clients to storage devices, such as network storage 114 and/or virtual storage devices, or other data centers. The data generated or sourced by system 100 may be stored in any number of persistent storage locations and devices, such as local client or server storage. The storage devices represent protection storage devices that serve to protect the system data through applications 104, such as a backup process that facilitates the backup of this data to the storage devices of the network, such as network storage 114, which may at least be partially implemented through storage device arrays, such as RAID (redundant array of independent disks) components. The data backup system may comprise a Data Domain system, in which case the Santorini network 101 supports various related filesystem and data managers, such as PPDM, as well as services such as ObjectScale and other services.

In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays for use by a backup server, such as a server that may be running Networker or Avamar data protection software backing up to Data Domain protection storage, such as provided by Dell Technologies, Inc.

Cluster network 101 includes a network 110 and also provides connectivity to other systems and components, such Internet 120 connectivity. The networks may be implemented using protocols such as Transmission Control Protocol (TCP) and/or Internet Protocol (IP), well known in the relevant arts. In a cloud computing environment, the applications, servers and data are maintained and provided through a centralized cloud computing platform.

As shown in FIG. 1, network 101 includes a collector service 104 and dynamic telemetry processing component 112 that is executed by the system to manage the telemetry architecture for users/customers of the system. Process 112 may be a process executed by a specialized node as a specially configured management or control node in system 100. Alternatively, it may be executed as a server process, such as by server 102 or any other server or client computer in the system. The telemetry management process 112 works with the other components of the distributed system and may use certain services or agents that run on each compute node 108 in the distributed system, such as may be implemented as a daemon process running in each node. As generally understood, a daemon is a computer program that runs as a background process, rather than being under the direct control of an interactive user.

As shown in FIG. 1, overall system 100 includes a storage system operated by a storage vendor 126 for protection of data of applications, operating systems, or resources of the cluster network 101. Such a vendor may be called upon to resolve issues or provide fixes to problems encountered by users of these products. In an embodiment, telemetry information 130 is transmitted between the vendor and telemetry data consumers 122, such as over the Internet 120 or over a local network link. In general, the telemetry can be sent to many destinations for use or "consumption" by many different types of consumers. One consumer might be a product customers or system users for their own management purposes. Another consumer might be internal processes that analyze telemetry and sometimes respond to adjust the system or send alerts to the vendor. The vendor itself may also be a consumer. Different types of telemetry can have different destinations, and some telemetry can go to multiple destinations.

Some consumers (e.g., vendors, system admins, etc.) may perform analysis, debugging, or modifications in the form of bug fixes, patches, revisions, etc., that the user can then install or execute in the cluster. In an embodiment, certain debugging tools may be provided in a node to help the vendor analyze and process the telemetry data. In general, the term "consumer" refers to any entity that receives the telemetry data for some use, and may include a user, subscriber, customer, and so on, of system data and resources. The telemetry data may be made available as part of any service, such as on a complementary basis or for a fee by a service provider by contract or subscription.

Figure 2:
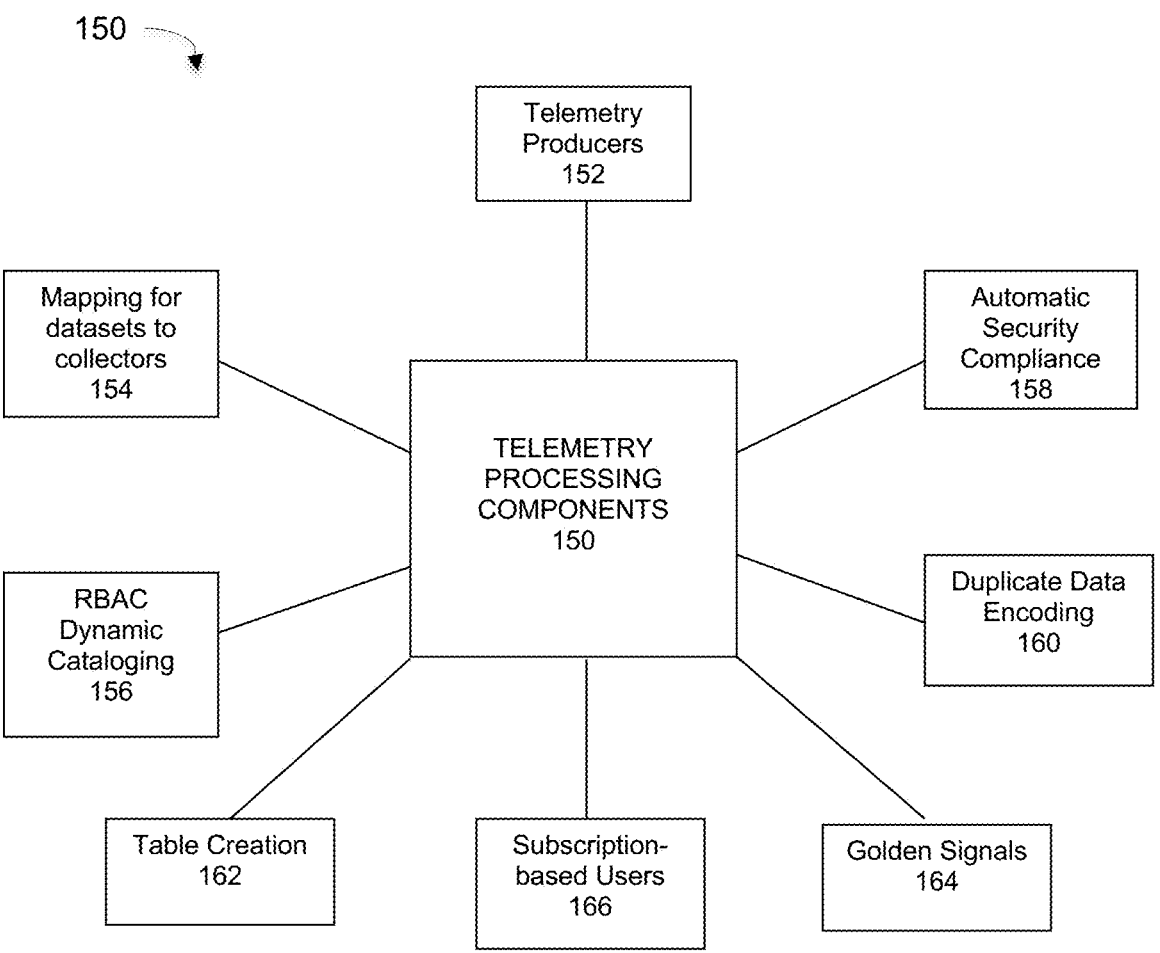
FIG. 2 is a diagram illustrating telemetry processing features for the system of FIG. 1, under some embodiments.

FIG. 2 is a diagram illustrating example telemetry service features for the system of FIG. 1. As shown in FIG. 2, the Santorini cluster 101 of FIG. 1 contains several different components 150 to provide telemetry services to the cluster as it performs its tasks of supporting applications in the system. The components of FIG. 2 allow services and producers to push telemetry to a centralized data store. Telemetry collectors push consistent metrics to "subscribers," which can be varied entities, such as graphical user interfaces (GUI), nodes (pods), or other processes internal or external to a product.

In system 150, telemetry producers 152 dynamically register to add new telemetry metrics. A subscription-based model is used to allow dynamic registrations from subscribers/users 166. The producers may be allowed access through role-based access control (RBAC) protocols. In an embodiment, system 150 may implement an open telemetry system (OTEL) that is opaque regarding transport of data to the subscribers.

The system allows dynamic frequency requests through a method to map data sets to collectors to optimize data collection and sharing, 154. It also provides RBAC-based dynamic cataloging and RBAC-based telemetry collection 156. Currently, catalogs do not show user based entries, and internal and external processes are not allowed to subscribe for different datasets. Process 156 remedies this shortcoming.

System 150 also includes automatic security compliance checks 158 for metric data during data collection, 158. Such compliance checks can be tunable with defined parameters and rules.

Optimization features can include encoding duplicate data values to optimize network bandwidth, 160, and other similar optimizations. For example, system 150 further includes a process for telemetry table creation and merging in time series for optimal data storage, 162. For sustainability, the system may enforce golden signals data collection, 164.

Details of these functional components are provided in greater detail below. The functions illustrated in FIG. 2 are just some examples of possible functions, and embodiments are not so limited. Additional or different functions may also be used.

In an embodiment, cluster network 101 providing the features of system 150 implements containerization technology through a Kubernetes implementation. A container is a virtualized computing environment to run an application program as a service or microservice, and are lightweight, portable data constructs that are decoupled from the underlying infrastructure. Applications are run by containers as microservices with the container orchestration service facilitating scaling and failover. For example, the container orchestration service can restart containers that fail, replace containers, kill containers that fail to respond to health checks, and will withhold advertising them to clients until they are ready to serve.

In an embodiment, system 100 uses Kubernetes as an orchestration framework for clustering the nodes 1 to N in FIG. 1. Application containerization is an operating system level virtualization method for deploying and running distributed applications without launching an entire VM for each application. Instead, multiple isolated systems are run on a single control host and access a single kernel. The application containers hold the components such as files, environment variables and libraries necessary to run the desired software to place less strain on the overall resources available. Containerization technology involves encapsulating an application in a container with its own operating environment, and the well-established Docker program deploys containers as portable, self-sufficient structures that can run on everything from physical computers to VMs, bare-metal servers, cloud clusters, and so on. The Kubernetes system manages containerized applications in a clustered environment to help manage related, distributed components across varied infrastructures. Certain applications, such as multi-sharded databases running in a Kubernetes cluster, spread data over many volumes that are accessed by multiple cluster nodes in parallel.

In Kubernetes, a pod is the smallest deployable data unit that can be created and managed. A pod is a group of one or more containers, with shared storage and resource requirements. Pods are generally ephemeral entities, and when created, are scheduled to run on a node in the cluster. The pod remains on that node until the pod finishes execution.

In an embodiment, the dynamic telemetry process 112 is used in a clustered network that implements Kubernetes clusters. One such example network is the Santorini system or architecture, though other similar systems are also possible.

Such a system can be used to implement a Data Domain (deduplication backup) process that uses object storage (e.g., Dell ObjectScale), Kubernetes, and different types of storage media, such as HDD, Flash memory, SSD memory, and so on. In an embodiment, a PPDM (PowerProtect Data Manager) microservices layer builds on the Data Domain system to provide data protection capabilities for VM image backups and Kubernetes workloads. Santorini exposes a global namespace that is a union of all namespaces in all domains.

Figure 3:
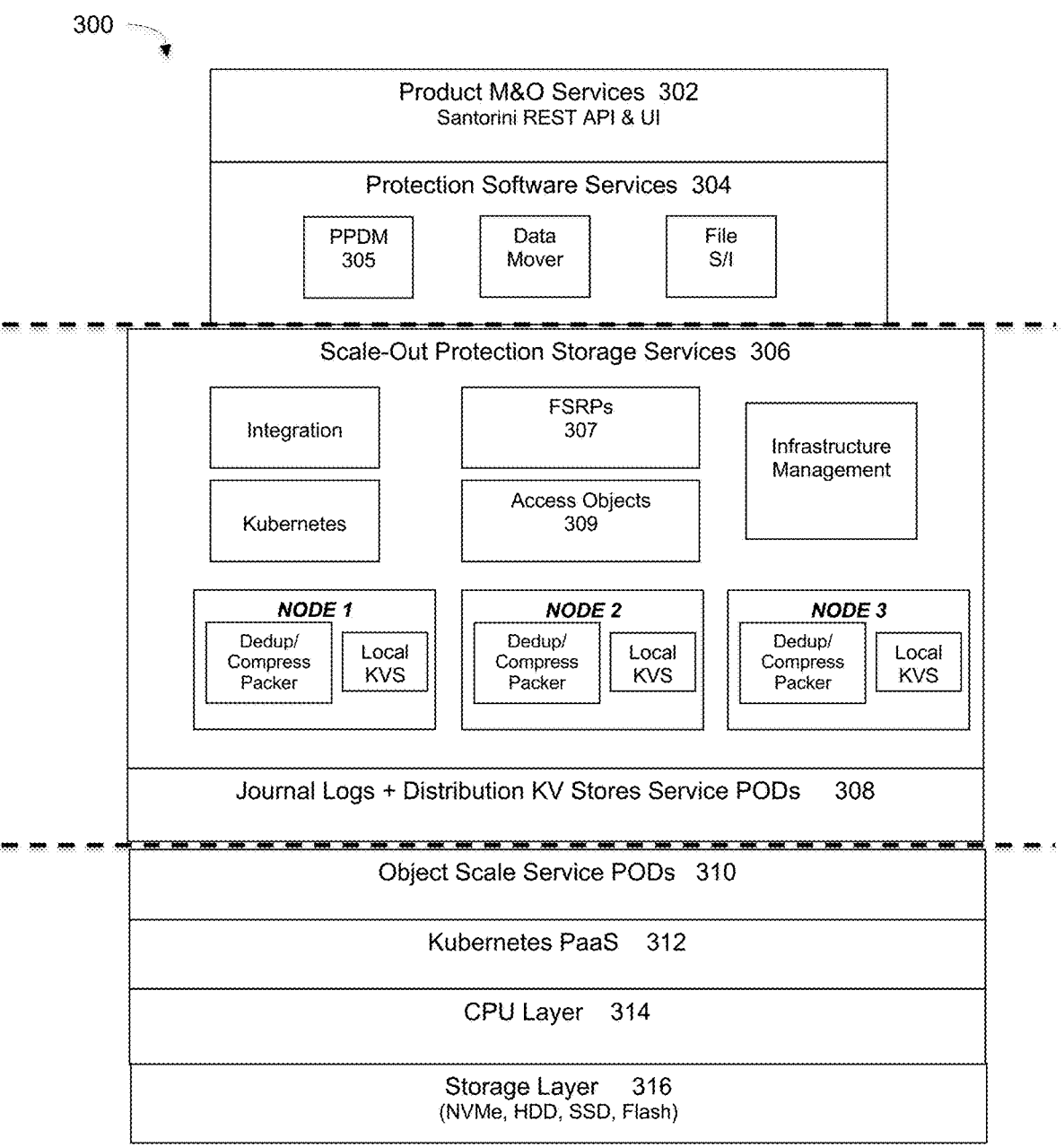
FIG. 3 illustrates an example of some services related to the data path running in Santorini cluster network, under some embodiments.

FIG. 3 illustrates an example of some services related to the data path running in Santorini cluster network, under some embodiments. As shown in diagram 300, a product services layer 302 provides the necessary REST APIs and user interface utilities. The API server implements a RESTful interface, allowing many different tools and libraries can readily communicate with it. A client called kubecfg is packaged along with the server-side tools and can be used from a local computer to interact with the Kubernetes cluster.

Below layer 302, the protection software services layer 304 includes a data manager (e.g., Power Protect Data Manager, PPDM) component 305 that provides backup software functionality. Within the scale-out protection storage services layer 306, the File System Redirection Proxy (FSRP) service 307 redirects file operations in a consistent manner based on the hash of a file handle, path, or other properties to instance of the access object service 309. The access object service 309 handles protocols and a content store manager. This means that files are segmented and the Lp tree is constructed by an access object 309. The FSRP 307 redirects file system accesses in a consistent way to the access objects 309 so that any in-memory state can be reused if a file is accessed repeatedly in a short time, and it avoids taking global locks.

Also included in this layer 306 are any number of nodes (e.g., Nodes 1 to 3, as shown), each containing a dedup/compression packer and a key-value (KV) store.

Distributed key value (KV) stores are also a component of Santorini and are used to hold much of the metadata such as the namespace Btree, the Lp tree, fingerprint index, and container fingerprints. These run as containers within the Santorini cluster and are stored to low latency media such as NVMe. There is also a distributed and durable log that replaces NVRAM for Santorini.

Subscription-Based Telemetry Architecture

Capturing data is critical to helping understand how applications and infrastructure perform at any given time. This information is gathered from remote, often inaccessible points within a system, and the data can be voluminous and difficult to store over long periods because of capacity limitations. As telemetry becomes more important for distributed software products, the need increases for flexible telemetry architecture defined for storage systems, as current systems are simply not dynamic enough to add new metric data sets, data producers or consumers in storage systems during runtime.

Telemetry data is typically made up of logs, metrics, and traces. Logs provide an event-based record of notable activities across the system and can be formatted as structured, unstructured, or plain text that give the results of any transaction involving an endpoint in the system, but that may require log analysis tools for user review. Metrics are numerical data points represented as counts or measures often calculated or aggregated over time. Metrics originate from several sources including infrastructure, hosts, and third-party sources. Most metrics are accessible through query tools. Traces are generated by following a process from start to finish (e.g., an API request or other system activity).

It should be noted that telemetry data may capture activities that comprise normal system operation or anomalies or fault conditions. Most telemetry data generated in a normal running system typically comprises routine system data. Telemetry data can also include or flag problems or issues in the system. Alerts are one type of telemetry indicating a problematic situation has occurred. In some cases, the system may be able to automatically recover from this condition. Other times, an alert means that support needs to be engaged to address the situation.

In an embodiment, the telemetry data of interest generally comprises metrics that may be provided in alphanumeric form and comprises information about a running system. Telemetry data is data that is generated periodically through normal system operation and that should be stored and transferred to users/clients when needed or requested. Such data may include characteristics such as space usage, latency for function calls or APIs, user-initiated operations, internal process status, network traffic, component temperatures, and so on. The telemetry data may be generated through generic system processes or Santorini-specific processes, such as backup/restore operations, deduplication processes, replication functions, configuration updates, Garbage Collection (GC) processes, and so on.

Telemetry data may be ultimately provided to an end user or administrator for system analysis, debugging, or other desired purposes. The telemetry data may be generated by the pods as raw data which is then transformed into formatted records for storage in a backend database. This data may then be input to a front-end database for use by the user.

In present systems, the telemetry data is based strictly on a static data definition. This results in fixed and non-flexible processing of such data. Embodiments provide a system that overcomes this shortcoming by providing a subscription-based approach to telemetry data generation and consumption, thus providing much greater flexibility in allowing new datasets, producers, and consumers to be dynamically defined and modified in running systems.

Figure 4:
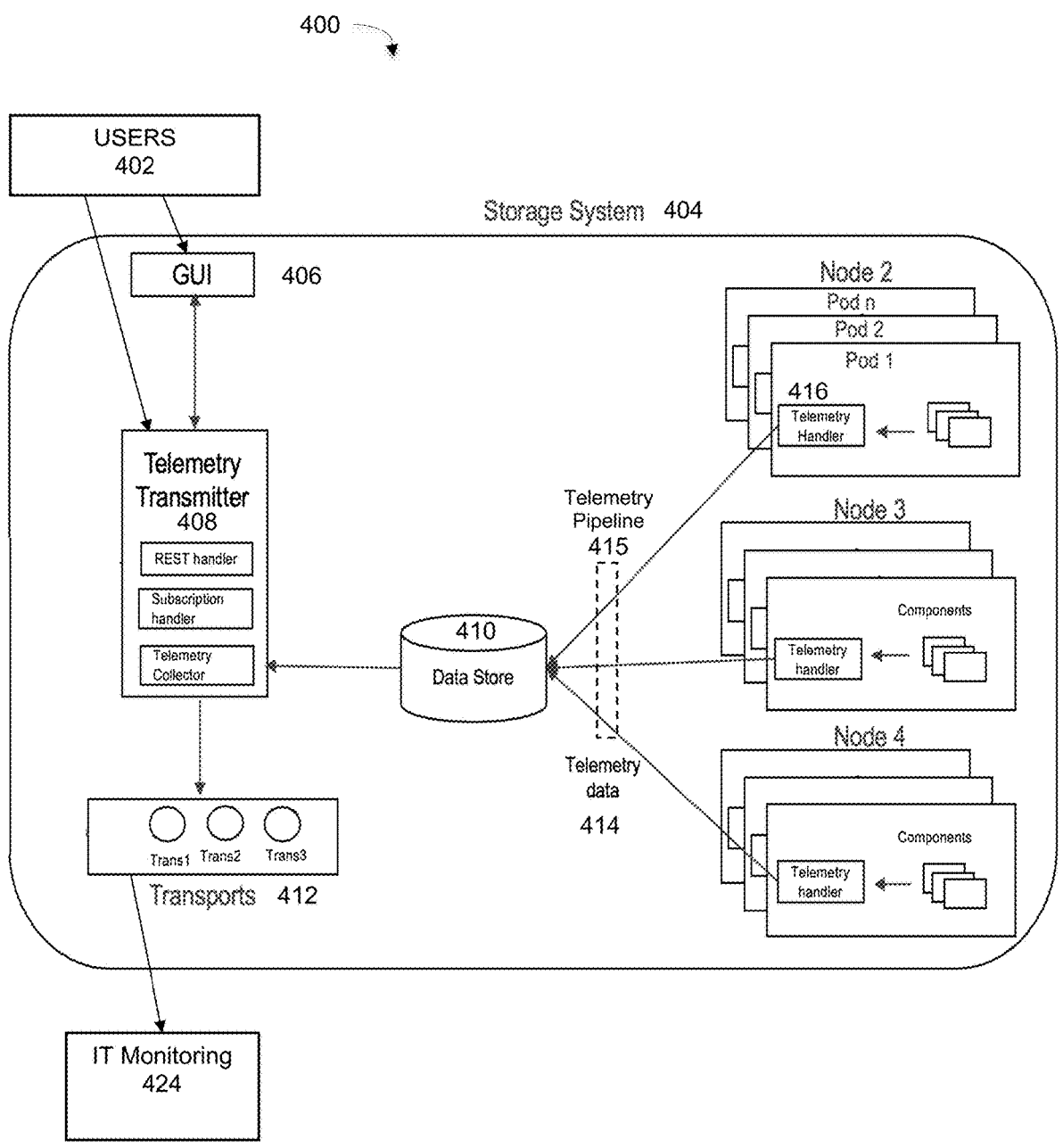
FIG. 4 illustrates an advanced telemetry architecture for Kubernetes-based storage systems, under some embodiments.

FIG. 4 illustrates an advanced telemetry architecture for Kubernetes-based storage systems, under some embodiments. As shown in FIG. 4, system 400 includes a containerized storage system 404 comprising a number of nodes (e.g., denoted Node 2, Node 3, Node 4, and so on), each having a number of pods (e.g., Pod 1 to n). Each pod has a telemetry handler component 416 that sends telemetry data 414 in the form of metrics to a data store 410.

In system 400, telemetry consumers are allowed to make dynamic subscriptions for receiving different metric datasets 414 through one or more different transport mechanisms 412 (e.g., Webhook, SMTP, SNMP, etc.) for which they have subscribed. Consumers can be GUIs 406, internal pods, storage vendor IT backend systems 424, or storage system users. Raw data from the pods is collected through their respective telemetry handlers 416 and stored in a central data store 410. In an embodiment, this can be done using Open Telemetry (OTEL) for a standard way of data collection. A telemetry transmitter 408 will then read data from data store, perform any required processing and then send the telemetry data to the subscribers through the subscribed transports 412. FIG. 4 shows some example subscribers as an IT monitoring component 424 and GUI 406 for use by user 402, but other consumers are also possible.

For a containerized storage system 400, such as shown in FIG. 4, the telemetry processing system is pod-based rather than node-based to provide a high level of granularity with respect to telemetry data production and consumption.

As mentioned above, system 400 may utilize an OTEL framework, where OTEL is generally understood to be an open source observability platform comprising a collection of tools, APIs and SDKs. OTEL enables users to instrument, generate, collect, and export telemetry data for further analysis. OTEL can provide a standard format dictating how data is collected and sent through unified sets of vendor-agnostic libraries and APIs. It removes the need to operate and maintain multiple agents/collectors.

In an embodiment, system 400 may collect telemetry data by having each service send the data directly to a backend process. Alternatively, system 400 may utilize a collector process implemented alongside each service. This allows a service to offload data quickly. Such a collector can also take care of additional processing, such as retries, batching, encryption, filtering, and so on.

FIG. 5 is a table that lists some example consumers and datasets for the system of FIG. 4, under some embodiments. For purposes of the present description, the term "consumer" generally means an entity, process, or component that uses telemetry data, such as listed in table 500, a "subscriber" is a consumer that has subscribed to use of telemetry data through a transport mechanism 412, and a "user" is an entity, such as a person, who accesses the telemetry data through a consumer, such as a GUI 406 or other appropriate mechanism.

As shown in table 500, consumers may include storage users, GUIs, internal pods, and storage vendors, among other possible consumers. Various different telemetry data sets may be consumed by each consumer out of all of the telemetry data produced by the pods. For example, storage users may consume alerts, summary data, and security states of the pods for the purpose of generating periodic (e.g., daily or hourly) alert summaries to cover any asynchronous alerts that may have been generated but missed by any of the relevant components in the system. A GUI consumer may consume performance and topology telemetry data to display the relevant topology and performance details in real-time to any interested storage users. Internal pods may consume feature detail information to determined system performance for the purpose of adjusting resources (load balancing) and similar purposes. The storage vendor may consume license, capacity, and usage information to enforce system subscription and business/contract terms to make sure all users maintain fair usage of the storage system. FIG. 5 is provided primarily for purposes of illustration, and many other consumers, consumed data, and purposes are also possible.

In an embodiment, a catalog is used to store the list of schemas of available metrics to which consumers can subscribe. Every metric will be represented in the catalog using its schema. When new metrics get dynamically registered by any telemetry producer through a REST API, schema of these new metrics get updated to the catalog so that consumers get up-to-date catalog information for subscription. A schema validator may be used that has defined rules that check the schema against the defined format requirements, such as valid JSON format, nesting within a number (n) of fields not beyond a maximum, and so on.

As mentioned above, consumers are allowed to make dynamic subscriptions for receiving different metric datasets 414 through one or more different transport mechanisms for which they have subscribed. FIG. 6 is a flowchart that illustrates a process of implementing a subscription-based telemetry architecture for Kubernetes-based scale-out products, under some embodiments. As shown in FIG. 6, process 600 begins by allowing telemetry consumers to make dynamic subscriptions for receiving metrics, 602. Subscribers can choose metric data sets and transports to receive those data sets. For example any consumer can customize notifications of data and the applicable datasets per system, as they can subscribe according to the system location or security setup, and so on.

The subscription process utilizes a plurality of database tables to store subscription states and values formatted according to defined schema. Tables can be defined for storing consumer details, metrics that they subscribe to, and the transports to be used, and additional tables may be used for storing details of available transports. FIG. 7A illustrates an example user subscription table, under some embodiments. As shown for the example of FIG. 7A, two example users, "User-1" and "User-2" are listed. User-1 may subscribe to metric data through the Webhook transport, which has ID "Webhook_target_ID," while User-2 may subscribe to alert data through the SMTP transport, which has ID "SMTP_target_ID. The entries of FIG. 7A are provided for purposes of example only, and any number of users and notification filters, transport mechanisms, and transport IDs may be used depending on system configuration.

A simplified subscription table may list metrics per user per transport as shown in example table 1 as follows:

TABLE 1

| M1 | U1 | T1 |
| M2 | U2 | T2 |
| M2 | U3 | T1 |

In Table 1 above, Mx refers to a specific metric datasets out of all the available telemetry data, Uy references a particular user, and $T_z$ references the selected transport mechanism. Thus, in the example of Table 1, metric M1 is sent to user 1 over transport 1, metric 2 is sent to user 2 over transport 2, and metric M2 is sent to user 3 over transport 1.

Each relevant entry in a consumer subscription table may generate different sub-tables. For example, table 720 of FIG. 7B illustrates a particular transport target table for FIG. 7A. As shown in FIG. 7B, the parameters associated with a particular transport, such as Webhook, may include a URL, server name, enable flag, and retry limit, among others. The entries of FIG. 7A are provided for purposes of example only, and any number of users and notification filters, transport mechanisms, and transport IDs may be used depending on system configuration. Any additional number of related or sub-tables for an initial user table, may also be provided.

For every type of transport, REST APIs are provided to consumers for subscription. For example, using the REST API for webhook subscription, a consumer can provide details of the webhook REST endpoint to be used for sharing metrics. The consumer can also mention which of the metrics from catalog need to be notified through the specified webhook REST endpoint. These details are stored in the consumer subscription table and other tables related to transports. Whenever scheduled telemetry jobs run and collect metrics, the consumer subscription table is checked. If there is a subscription for the collected metrics through a specific transport, the job will share the mentioned metrics through the specified transport.

Although embodiments are described with respect to using REST APIs, it should be noted that embodiments are not so limited. Other similar mechanisms that facilitate consumer access and subscription to the metrics are also possible. Likewise, the subscription table can be implemented through a system database or any similar centrally stored and accessible data element.

Telemetry datasets are collected and kept in a structured format for sharing with consumers, 604. The consumers can span various entities, such as GUI/pods across cluster nodes, storage system users, vendor IT backend, and so on. All such consumers get the same metric datasets from the central data store to ensure data consistency, 606. At any point in time, therefore, the data received for a specific metric by all subscribers will be the same.

If any aspect of the network changes with respect to the production of telemetry data, the consumer subscriptions are all updated automatically, such as if any metric, producer, transport, and so on, is modified or added, 608. This update occurs within a defined period of time after the change occurs, and is implemented through an update to the relevant consumer databases. In an embodiment, when a producer registers a new metric using the registration REST API, this new metric is validated for schema and then added to the catalog dynamically. An info alert will be generated in the system so that prospective consumers are informed that a new metric is available for subscription. If any subscriber or system admin updates details of the transport enabled in the system, the transport details are automatically updated in respective database tables through a REST API workflow.

The raw data from a pod can be provided in any appropriate format depending on the type of pod/service and data type. For example, if a pod provides disk capacity data, such data can be formatted as follows:

```
master1:-/new_metricstest/data # cat data_domain_disk_capacity.json
{
    "serial number":  "AUDVRN72S7DJCP",
    "disk":  "dev4",
    "slot":  "160:3",
    "model":  "VMware Virtual_disk",
    "firmware":  "n/a",
    "type":  "SAS-SSD",
    "partNumber":  "n/a",
    "serialNo":  "6000c293a7d6......,",
    "capacity":  536870912000
}
```

The above example shows programming code for an example virtual disk used in a Data Domain system. This data can converted to a structured format for storage in one or more tables in the data store. FIG. 8 illustrates a table made up of parts 802a and 802b storing a dataset for a pod, under an example embodiment. It should be noted that the above shown programming code is provided for purposes of illustration only, and any data structure, programming language, definitions, values, and so on, may be used.

Figure 9:
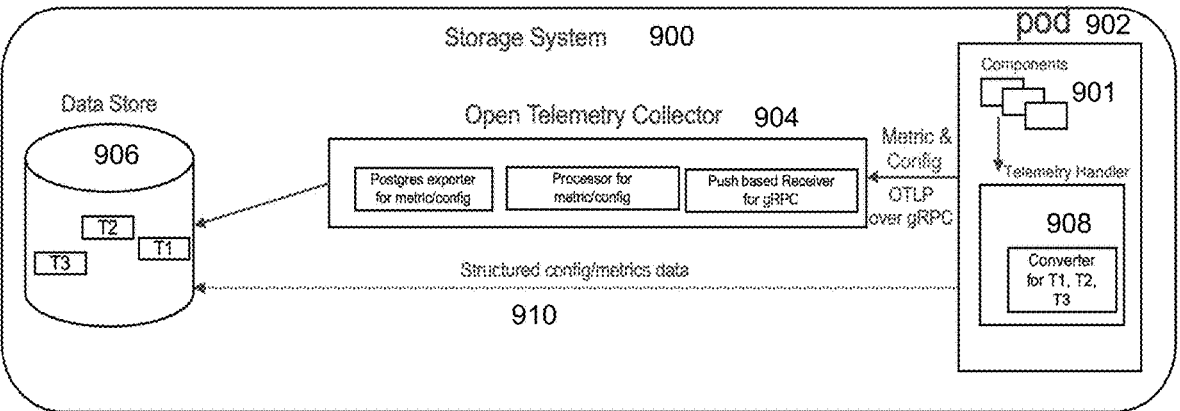
FIG. 9 illustrates a telemetry data pipeline, under some embodiments.

As shown in FIG. 4, the raw telemetry data 414 from the pods is sent through a pod resident telemetry handler 416 to the data store 410. In an embodiment, the raw telemetry data 414 is sent to the data store through a telemetry pipeline 415. FIG. 9 illustrates a telemetry data pipeline, under some embodiments. In FIG. 9, storage system 900 comprises a pod 902 coupled to data store 906 through an open telemetry collector 904. The pod 902 contains certain components 901, such as disks, devices, and so on. These components all periodically generate telemetry data that is input to telemetry handler 908. The telemetry handler includes a converter to convert the telemetry datasets for the components, such as denoted T1, T2, T3, for the example of FIG. 9. The metric telemetry data is input from the pod 902 to the collector 904 over appropriate interfaces, such as OTLP (Open Telemetry protocol) gRPC (remote procedure call) interfaces, and the like. The collector includes a push-based receiver, a processor, and an exporter for the metric data. The datasets (T1, T2, T3) are then stored in data store 906. In an embodiment, the metric data can also be converted to structured data in the pod's telemetry handler 908 and sent for storage in data store 906 directly as the structured data 910.

Datasets are exposed to users through a variety of different interfaces (e.g., REST/CLI/GUI or notifications), and will be consistent at any time point as they are sent from the same data pool and pre-defined frequency.

Product vendors, through their backend components can subscribe for new datasets from systems in the field dynamically. Datasets shared with vendor backends are structured, and OTEL-based data enables community tools to be leveraged for data analytics.

RBAC-Based Dynamic Catalog

Practically, in all commercial deployments of distributed data systems, certain data is sensitive enough to warrant protection by certain data security measures, such as storage in dedicated memory, enhanced backup and restore processes, access restrictions, heightened alerts, and so on.

A common way to protect such data is to limit access to users based on their identity and roles within the organization, such as by using role-based access control (RBAC) mechanisms. RBAC rules allow or deny access to files or directories on the basis of role-permissions or user-role and role-role relationships, as opposed to strict user identities, such as used by access control list (ACL) control. Within an organization, roles are created for various job functions (e.g., Engineering, Sales, IT, Administration, etc.), and RBAC permissions assign certain operations or access permissions to specific roles. People can automatically acquire or lose permissions by taking on or losing different roles.

In an embodiment, the telemetry process 112 includes an RBAC-based dynamic catalog 115 to limit transmission of telemetry data to only those individuals having roles that are authorized to access the metric datasets. Through this process only subscribers that are allowed to subscribe for specific types of telemetry can receive that data. For example, metric datasets related to system security need not be sent to all consumers except security officer personnel, and so on.

RBAC or other role-related access controls can be based on users' job roles, and some of them may be hierarchical. Roles needing to deal with different types of data will be allotted separate access controls. For example, Human Resource (HR) department personnel can be allotted access controls to access employee related data but will not have access to, say, infrastructure related data. An example for hierarchical access control is like a security officer who can access system level security related data as well as individual user access data. While a normal user can get access to only data related to that particular user.

Figure 10:
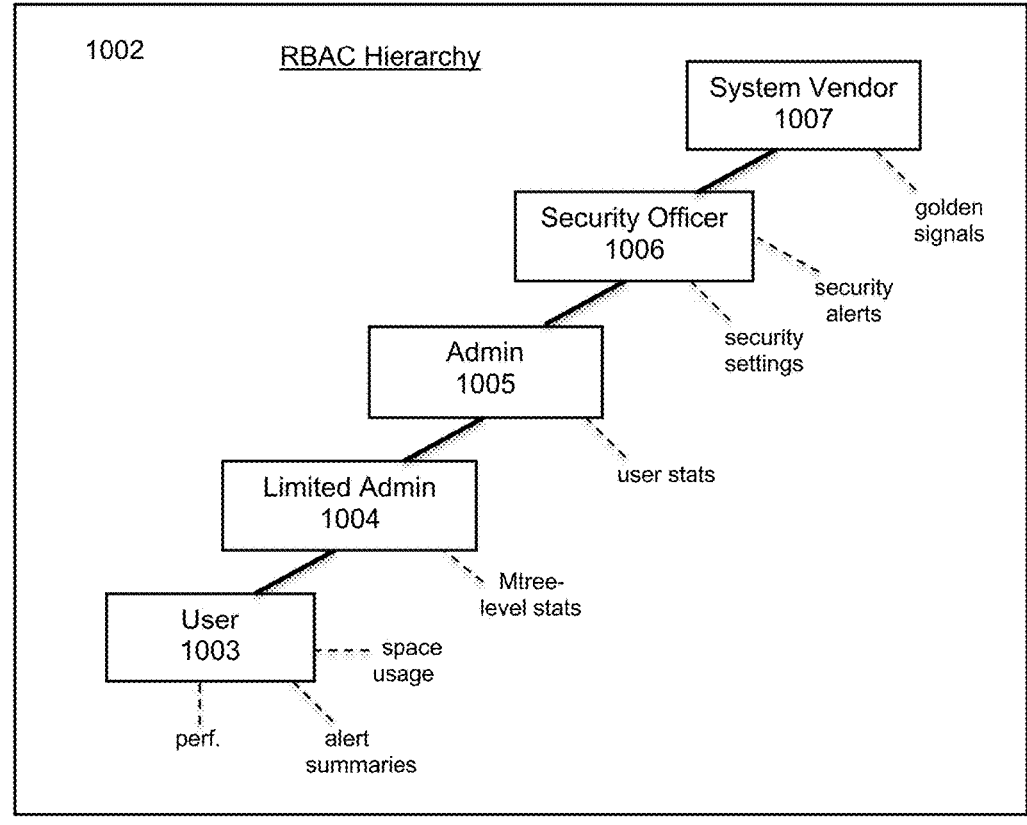
FIG. 10 illustrates an example user roles in a hierarchy used for the RBAC-based dynamic catalog, under some embodiments.

For dissemination and access to telemetry data, as opposed to actual content data of the cluster network, the telemetry process 112 through the dynamic catalog 115 defines its own hierarchy with respect to security telemetry data access for cases where hierarchy, and not just roles, is a consideration. FIG. 10 illustrates an example RBAC hierarchy used for the RBAC-based dynamic catalog, under some embodiments. As shown for the example of FIG. 10, the RBAC hierarchy comprises, from low to high, users 1003, limited administrators 1004, administrators 1004, security officer 1006, and system vendor 1007. In this hierarchy, the users are subject to most limited access and the system vendor is granted virtually unlimited access to the telemetry data, with increased levels of restriction for those roles/entities in between.

For the example of FIG. 10, users 1003 may be able to receive telemetry data relating only to performance, space usage, alert summaries, and so on. The limited administrators 1004 may be able to receive this information along with directory or Mtree-level statistics, while the administrator 1005 may be able to receive user statistics as well as the other lower level telemetry data.

With respect to security-related telemetry data, the security officer 1006 is generally the entity that is allowed to receive security setting, security alerts, and other similar telemetry data. In an embodiment in which the cluster network is provided for customer users as a platform solution, the system vendor is generally the only party entitled to access all of this telemetry data as well as so-called 'Golden Signals' that related to traffic, latency, errors, saturation, and other network related events and data, and that may be helpful to the vendor in identifying and addressing network issues.

It should be noted that FIG. 10 illustrates five distinct levels of role hierarchy with respect to telemetry data related to security aspects, however, embodiments are not so limited. Any practical number of levels comprising any appropriate division of roles and personnel may be used. Similar hierarchical roles can also be established and used for other aspects instead of or in addition to security data as well, such as performance related data, and so on.

The access to the appropriate data can be provided in any RBAC appropriate rule set either defined by the system itself, or as provided in any standard rule definitions that may be available for corporations, industries, and so on. For example, in a Kubernetes cluster network, the RBAC rules may be configured using built-in RBAC support APIs and a feature that creates objects provided by a function like: rbac.authorization.k8s.io.

In an embodiment, the RBAC-based aspect of metric dataset sharing is handled while accepting subscriptions from users. Every metric dataset will be shared with only eligible users or sets of users based on the RBAC roles or hierarchy (e.g., FIG. 10).

The metric datasets are cataloged through process 115 along with one or more RBAC rules. Every RBAC rule is mapped to set of user roles. For example, RBAC1 may be mapped to the user role 1003, RBAC2 may be mapped to the limited admin role 1004, and so on. Each metric dataset (e.g., Metric M1) will be stored in the catalog along with the applicable RBAC rule. The RBAC rules generally assign the access rights based on the roles of personnel, and in some cases a hierarchy, such as shown in FIG. 10, where, for example, the security officer role 1006 includes privileges as a user 1003 plus more. When the metric catalog is requested by a user, the returned catalog will be filtered after checking that user's role and allowing transmission of only those metrics allowed for that role.

The RBAC catalog may be maintained in a database as a table, library, or any other appropriate data element accessible by process 115 of FIG. 1. The RBAC checks for the telemetry data access is done during metric data generation itself using the dynamic catalog, which itself can be updated as needed while the cluster network is running. In this manner, the catalog of metric telemetry data allowed for every user according to the role can be constantly updated and used, and a user can choose only metrics from the provided catalog for which they are entitled to access.

Figure 11:
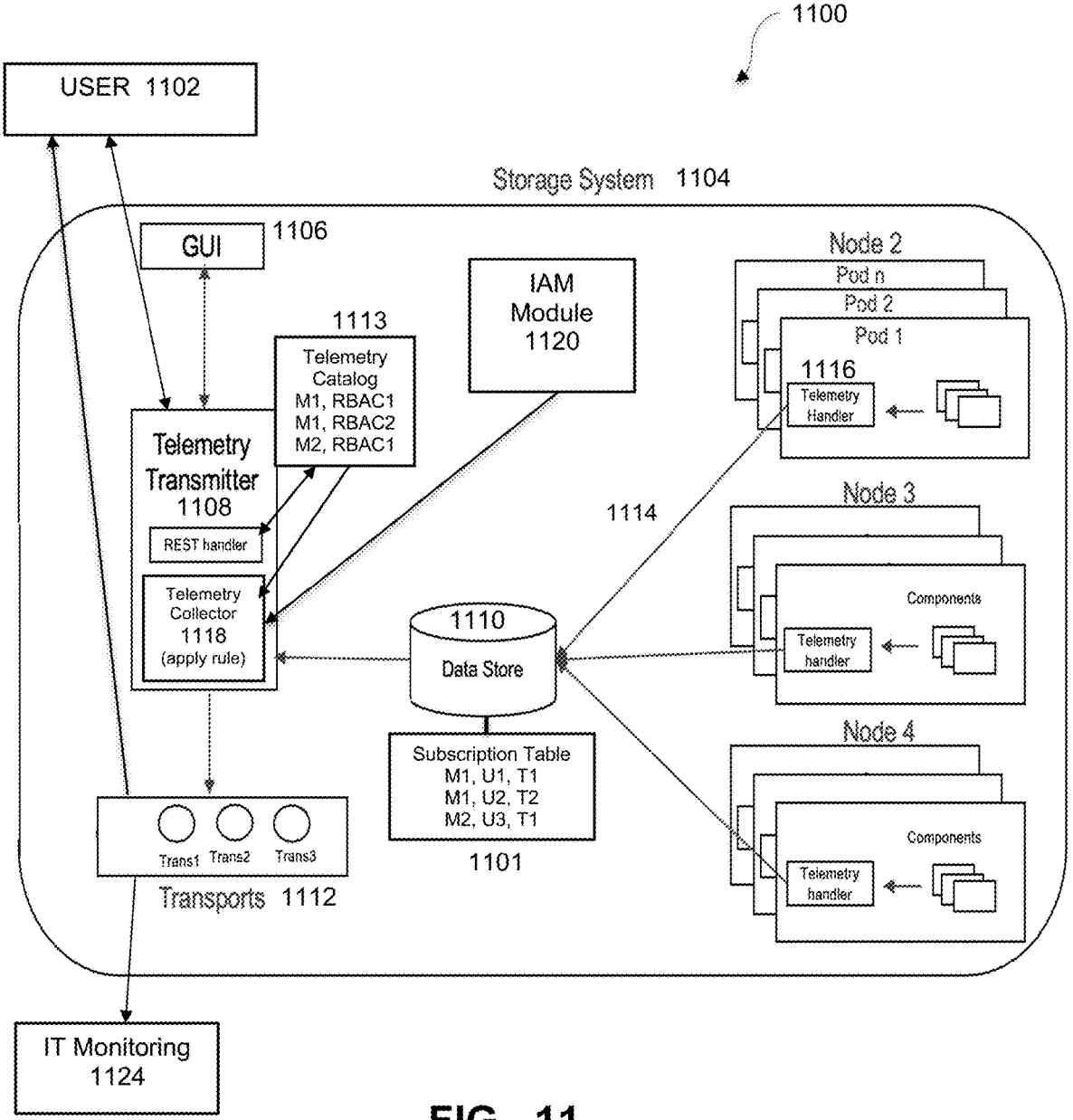
FIG. 11 illustrates a telemetry data processing system implementing an RBAC-based dynamic catalog, under some embodiments.

FIG. 11 illustrates a telemetry data processing system implementing an RBAC-based dynamic catalog, under some embodiments. automatic checkpoints can be added using the compliance-check library. System 1100 of FIG. 11 includes a containerized storage system 1104 comprising a number of nodes (e.g., denoted Node 2, Node 3, Node 4, and so on), each having a number of pods (e.g., Pod 1 to n). Each pod has a telemetry handler component 1116 that sends telemetry data 1114 in the form of metric datasets to a data store 1110. Telemetry consumers (users) make dynamic subscriptions (as described above) to receive metric datasets through one or more different transport mechanisms 1112. Raw data 1114 from the pods is collected through their respective telemetry handlers 1116 and stored in the central data store 1110. A telemetry transmitter 1108 reads data from data store, performs any required processing and then sends the telemetry data to the users 1102 or other entities, such as IT monitoring 1124 through the subscribed transports 1112.

As described above, the various consumers of telemetry data 1114 subscribe to receive desired metric datasets over appropriate transports 1112. A subscription table 1101 (such as illustrated in Table 1, above) can be set up and stored in the data store 1110.

In system 1100, besides the subscription terms, access to the telemetry data is further checked against RBAC restrictions. FIG. 11 shows the incorporation of an RBAC-based dynamic catalog, under some embodiments. For the embodiment of system 1100, storage system 1104 has or has access to an IAM (identity and access) module. This may be implemented through an on-board IAM server or service provider (internal or external). The IAM module provides the framework for business processes and policies that facilitates the management of digital identities of the entities of system 1104, and that are used by the processes and administrators to control user access to data in the system. In an embodiment, the IAM module 1120 interfaces with the telemetry collector 1118 of telemetry transmitter 1108 to control access to the telemetry data 1114.

A dynamic telemetry catalog 1113 stored in or accessible by the telemetry transmitter 1108, such as through a REST handler) stores metric dataset to RBAC rules. The dynamic telemetry catalog associates metric datasets (denoted Mx) by type against different RBAC rules (denoted RBACy). The RBAC rules are each mapped to a specific role in the hierarchy. Thus, for the example of FIG. 10, there would be five RBAC rules denoted RBAC1 to RBAC5, with possibly RBAC1 mapped to users, RBAC2 mapped to limited admins, all the way to RBAC5 mapped to the system vendor.

The telemetry catalog 1113 comprises a database or table that associates the metric datasets with any and all of the RBAC rules that apply. A simplified telemetry catalog may list metrics per user per transport as shown in example table 2 as follows:

TABLE 2

| | |
|------|-------|
| M1 | RBAC1 |
| M1 | RBAC2 |
| M2 | RBAC1 |

In Table 1 above, Mx refers to a specific metric datasets out of all the available telemetry data, and RBACy references a RBAC rule. Thus, in the example of Table 1, metric M1 is sent to users satisfying rule RBAC1 and users satisfying rule RBAC2, metric 2 is sent to users satisfying rule RBAC1.

In an embodiment, the IAM module 1120 provides the user and RBAC mapping that is stored in the catalog and used by the telemetry collector 1118. The telemetry collector applies a hierarchical relationship rule to determine whether or not a user can be sent the metric dataset. In a hierarchical scheme, such as in FIG. 10, any user with a RBAC level equal to or greater than (>=) the RBAC rule level can receive the metric dataset. Thus, the rule may be enunciated as: "if user's RBAC>=catalog RBAC, then send". This illustrates one possible and common rule, however other rules are also possible, strictly greater than (>), and so on. Likewise, if a non-hierarchical organization is used, the rule may require explicit correspondence of metric dataset to each RBAC level, in which case, the rule may be strictly equal to (=).

In an embodiment, the catalog 1113 can be provided to the user 1102 so that all users in a system are made aware of the RBAC restrictions on dissemination of telemetry data.

FIG. 12 is a flowchart that illustrates a method of allowing access to telemetry data through an RBAC-based dynamic catalog, under some embodiments. Process 1200 of FIG. 12 begins with step 1202 of defining the user and RBAC mapping in the IAM module or similar management process. This mapping defines a correlation of metric datasets to corresponding RBAC rules, which are stored in an RBAC-based catalog accessible by the telemetry collector of the telemetry transmitter, 1204.

As telemetry data is generated and stored in a datastore, it is sent to a telemetry transmitter for transmission to subscribed consumers per their respective subscriptions. For this process, a subscription table is checked to verify only valid subscribed consumers will receive the data per their selected transport, 1206.

The metric datasets of the telemetry data are checked against the RBAC-based telemetry catalog to verify that the user can receive the telemetry data per the applicable RBAC rule, 1208, and if so, the data is collected and transmitted by the telemetry transmitter, 1210.

This process adds a second layer above subscription information to safeguard the security of telemetry data based on RBAC rules, and allows the system to define conditions under which certain users can receive certain types of telemetry data in an efficient and dynamic manner.

Embodiments have been described with respect to RBAC rules for access restriction, however, other similar mechanisms may also be used. For example, an Access Control List (ACL) is a list of permissions associated with data objects that specifies which users or system processes are allowed on given objects. It is usually embodied as a table specifying a subject and an operation, such as (Jane: read, write; John: read). Instead of RBAC rules, an ACL or similar filter process may also be used.

As described above, in an embodiment, system 100 includes certain processes that may be implemented as a computer implemented software process, or as a hardware component, or both. As such, it may include executable modules executed by the one or more computers in the network, or embodied as a hardware component or circuit provided in the system. The network environment of FIG. 1 may comprise any number of individual client-server networks coupled over the Internet or similar large-scale network or portion thereof. Each node in the network(s) comprises a computing device capable of executing software code to perform the processing steps described herein.

FIG. 13 is a block diagram of a computer system used to execute one or more software components of the processes described herein, under some embodiments. The computer system 1000 includes a monitor 1011, keyboard 1017, and mass storage devices 1020. Computer system 1000 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 is an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules, or instantiated as distributed objects. The computer software products may also be component software. An operating system for the system may be one of the Microsoft Windows®. family of systems (e.g., Windows Server), Linux, Mac™ OS X, Unix, and so on.

Although certain embodiments have been described and illustrated with respect to certain example network topographies and node names and configurations, it should be understood that embodiments are not so limited, and any practical network topography is possible.

Embodiments may be applied to data, storage, industrial networks, and the like, in any scale of physical, virtual or hybrid physical/virtual network, such as a very large-scale wide area network (WAN), metropolitan area network (MAN), or cloud-based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network. The network may comprise any number of server and client computers and storage devices, along with virtual data centers (vCenters) including multiple virtual machines. The network provides connectivity to the various systems, components, and resources, and may be implemented using protocols such as Transmission Control Protocol (TCP) and/or Internet Protocol (IP), well known in the relevant arts. In a distributed network environment, the network may represent a cloud-based network environment in which applications, servers and data are maintained and provided through a centralized cloud-computing platform.

Some embodiments of the invention involve data processing, database management, and/or automated backup/recovery techniques using one or more applications in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Although embodiments are described and illustrated with respect to certain example implementations, platforms, and applications, it should be noted that embodiments are not so limited, and any appropriate network supporting or executing any application may utilize aspects of the backup management process described herein. Furthermore, network environment 100 may be of any practical scale depending on the number of devices, components, interfaces, etc. as represented by the server/clients and other elements of the network. For example, network environment 100 may include various different resources such as WAN/LAN networks and cloud networks 102 are coupled to other resources through a central network 110.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of processing telemetry data in a cluster network having a plurality of nodes, comprising:

storing the telemetry data as generated by telemetry producers in the network in a data store as metric datasets according to data type;

defining privileges of users to receive the metric datasets based on role-based access control (RBAC) rules derived from roles of the users in an organization using the network;

mapping the metric datasets to corresponding RBAC rules for loading into a telemetry catalog accessible by a hardware-based telemetry transmitter transmitting the metric datasets from the datastore;

checking the telemetry catalog as telemetry data is transmitted to a respective user to verify that the respective user is privileged to receive the telemetry data under the RBAC rules to facilitate data security through dissemination of telemetry to only valid users; and processing the telemetry data through a hardware-based telemetry pipeline, wherein the cluster network comprises a Santorini network processing containerized data utilizing a Kubernetes-based framework, and further wherein the plurality of nodes each contain a plurality of pods performing network functions and generating the telemetry data for transmission to the subscribing consumers, and yet further wherein the telemetry data comprises data generated periodically by each producer upon operation in the cluster network, and consists of performance data, topology information, alerts, security states, and service features, and further wherein the one or more consumers comprises at least one of: pod components of the nodes, storage users, graphical user interfaces (GUI), and storage vendors.

2. The method of claim 1 wherein the mapping step is performed by an identity and access management (IAM) module accessible by the telemetry transmitter.

3. The method of claim 2 further comprising allowing review of the telemetry catalog by the users including the respective user, and further comprising allowing update of the telemetry catalog by the IAM module, as needed and while the network is running and executing applications, in order to dynamically maintain up-to-date RBAC rules.

4. The method of claim 1 wherein the RBAC rules affect at least a data security aspect of the telemetry data and content data associated with the telemetry data, and further wherein the telemetry data comprises data generated periodically by the producer upon operation in the cluster network, and wherein the telemetry data comprises performance data, topology information, alerts, security states, and service features.

5. The method of claim 4 wherein roles conform to a hierarchy that ranges from users to administrators to security officers to a vendor of the network, in order of low to high privileges with respect to receiving the telemetry data based on data type.

6. The method of claim 5 further comprising:

formatting the received telemetry data into a structured format for storage in a central datastore;

defining the users as one or more consumers of respective data of the telemetry data in the network; and transmitting the respective data to the consumers through a selected transport mechanism, wherein the one or more consumers comprises at least one of: pod components of the nodes, storage users, graphical user interfaces (GUI), and storage vendors.

7. The method of claim 6 further comprising:

producing the telemetry data in a hardware-based telemetry handler of a respective pod of the telemetry producer;

performing the checking step automatically upon production of the telemetry data by the telemetry handler; and inputting the telemetry data to the datastore through the telemetry pipeline.

8. The method of claim 7 wherein the telemetry pipeline implements an Open Telemetry (OTEL) protocol, and comprises a collector receiving the telemetry data through a remote procedure call (RPC) process, and further wherein cluster network includes nodes each containing a plurality of pods performing network functions and generating the telemetry data for transmission to the consumers.

9. The method of claim 1 wherein the checking step is performed by a hardware-based telemetry collector component of the telemetry transmitter applying an appropriate RBAC rule to the user for a specified metric dataset.

10. A method of processing telemetry data in a cluster network having a plurality of telemetry producers each periodically generating metric datasets, comprising:

receiving a set of role-based access control (RBAC) rules dictating permissions of users to receive specific metric datasets of the telemetry data based on datatype;

storing the RBAC rules in a telemetry catalog for access by a hardware-based telemetry transmitter, wherein the telemetry data comprises data generated periodically by each producer upon operation in the cluster network, and consists of performance data, topology informa- tion, alerts, security states, and service features, and further wherein the one or more consumers comprises at least one of: pod components of the nodes, storage users, graphical user interfaces (GUI), and storage vendors;

checking each metric dataset generated by a telemetry producer against the RBAC rules for verification that a user can receive the metric dataset under the RBAC rules to facilitate data security through dissemination of telemetry to only valid users;

transmitting the metric dataset through a selected trans- port mechanism of a hardware-based telemetry pipeline as specified in a subscription process;

processing the telemetry data in a telemetry handler of a respective telemetry producer in each node of the plurality of nodes; and inputting the telemetry data to the datastore through the telemetry pipeline implementing an Open Telemetry (OTEL) protocol, and comprises a collector receiving the telemetry data through a remote procedure call (RPC) process, and further wherein the cluster network comprises a Santorini network processing container- ized data utilizing a Kubernetes-based framework, and wherein the plurality of nodes each contain a plurality of pods performing network functions and generating the telemetry data for transmission to the subscribing consumers.

11. The method of claim 10 wherein the RBAC rules are generated by an identity access management (IAM) module, and further wherein the telemetry data comprises data gen- erated periodically by the producer upon operation in the cluster network, and wherein the telemetry data comprises performance data, topology information, alerts, security states, and service features.

12. The method of claim 11 wherein the RBAC rules are derived from a hierarchy of the roles of the users in an organization using the network.

13. The method of claim 12 wherein the hierarchy ranges from users to administrators to security officers to a vendor of the network, in order of low to high privileges with respect to receiving the telemetry data based on data type.

14. The method of claim 10 further comprising allowing update of the telemetry catalog by the IAM module, as needed and while the network is running and executing applications, in order to dynamically maintain RBAC rules for the users.

15. A system processing telemetry data in a cluster network having nodes each containing a plurality of pods, the system comprising:

a datastore storing the telemetry data as generated by telemetry producers in the network in a data store as metric datasets according to data type;

an identity access management (IAM) module defining privileges of users to receive the metric datasets based on role-based access control (RBAC) rules derived from a role of the users in an organization using the network;

a hardware-based telemetry transmitter storing a telem- etry data catalog mapping the metric datasets to corre- sponding RBAC rules, and transmitting the metric datasets from the datastore through a hardware-based telemetry pipeline to facilitate data security through dissemination of telemetry to only valid users; and a hardware-based telemetry collector checking the telem- etry catalog as telemetry data is transmitted to a respec- tive user to verify that the respective user is privileged to receive the telemetry data under the RBAC rules, wherein the cluster network comprises a Santorini network processing containerized data utilizing a Kubernetes-based framework, and further wherein the plurality of nodes each contain a plurality of pods performing network functions and generating the telemetry data for transmission to the subscribing con- sumers, and yet further wherein the telemetry data comprises data generated periodically by each producer upon operation in the cluster network, and consists of performance data, topology information, alerts, secu- rity states, and service features, and further wherein the one or more consumers comprises at least one of: pod components of the nodes, storage users, graphical user interfaces (GUI), and storage vendors.

16. The system of claim 15 wherein telemetry data involves at least a data security aspect of the telemetry data and content data associated with the telemetry data, and further wherein the RBAC rules are derived from a hierar- chy of the users in an organization using the network, and yet further wherein hierarchy ranges from users to admin- istrators to security officers to a vendor of the network, in order of low to high privileges with respect to receiving the telemetry data based on data type.

* * * * *